(12) United States Patent
Garner

(10) Patent No.: US 12,504,543 B2
(45) Date of Patent: Dec. 23, 2025

(54) SYSTEMS, METHODS, AND MEDIA FOR CALCULATING AN OVERBOUND DISTRIBUTION, FROM A BASE MIXTURE DISTRIBUTION, THAT CAN BE USED WITH A SOLUTION-SEPARATION RAIM ALGORITHM

(71) Applicant: NovAtel Inc., Calgary (CA)

(72) Inventor: Graeme Garner, Calgary (CA)

(73) Assignee: NovAtel Inc., Calgary (CA)

( * ) Notice: Subject to any disclaimer, the term of this patent is extended or adjusted under 35 U.S.C. 154(b) by 0 days.

(21) Appl. No.: 18/586,936

(22) Filed: Feb. 26, 2024

(65) Prior Publication Data

US 2024/0345258 A1   Oct. 17, 2024

Related U.S. Application Data

(60) Provisional application No. 63/458,775, filed on Apr. 12, 2023.

(51) Int. Cl.
G01S 19/47 (2010.01)
G01S 19/20 (2010.01)

(52) U.S. Cl.
CPC .............. G01S 19/20 (2013.01); G01S 19/47 (2013.01)

(58) Field of Classification Search
CPC ................................ G01S 19/20; G01S 19/47
See application file for complete search history.

(56) References Cited

U.S. PATENT DOCUMENTS 10,684,375 B2   6/2020   Phatak et al.
12,085,654 B2   9/2024   Reimer et al.

FOREIGN PATENT DOCUMENTS

EP   3598177 B1   3/2021

OTHER PUBLICATIONS

Blanch, et al., "A Method to Determine Strict Gaussian Bounds of a Sample Distribution," 2018, 12 pages.
European Search Report completed Sep. 18, 2024 for corresponding EP Patent Application No. EP 24 16 3978, mailed Oct. 4, 2024, 8 pages.
Shively, et al., "A Gaussian Mixture Model for Error Distributions Used in Assessing RAIM Performance," Jan. 30, 2012, pp. 1590-1623.

(Continued)

*Primary Examiner* — Mathew Franklin Gordon
(74) *Attorney, Agent, or Firm* — Cesari and McKenna, LLP

(57) ABSTRACT

An overbound distribution is calculated from a base mixture distribution. For a bounded region, the base distribution is lower-bound at an evaluation point with a second-order polynomial of the base distribution and upper-bound at the evaluation point with a first-order polynomial of a single distribution with a standard deviation value calculated from the base distribution. If the step size from the evaluation point to an intersection of the lower and upper bounds is less than a threshold, the standard deviation value can be iteratively increased until the step size exceeds the threshold. The process is performed for additional portions of the base distribution up to a critical value to determine a final adjusted standard deviation value for the single distribution that is tightly bound to the base distribution and that can be used by a solution algorithm to determine a solution (used to seed filter states for a navigation filter).

20 Claims, 5 Drawing Sheets

(56) References Cited

OTHER PUBLICATIONS

Bar-shalom Yaakov et al., "Introduction: Theory, Algorithms and Software" in "Estimation with Applications to Tracking and Navigation: Theory, Algorithms and Software," Jan. 4, 2002, Wiley, pp. 1-88, Retrieved from the Internet: https://onlinelibrary.wiley.com/doi/pdfdirect/10.1002/0471221279.ch1 pp. 55-57, section 1.4.16.

Huber Marco F et al., "Progressive Gaussian Mixture Reduction", Jul. 30, 2008, Retrieved from the Internet: https://ieeeexplore.ieee.org/stampPDF/getPDF.jsp?tp=&arnumber=4632186&ref=aHR0cHM6Ly9pZWVleHBsb3J1Lm11ZWUub3JnL2Fic3RyYWNOL2RvY3VtZW50LzQ2MzIxODY= pp. 2-4, sections II and III.

Chauhan Shubhendra Vikram Singh et al., "Vertical Protection Level Estimation for Direct Positioning Using a Bayesian Approach", GNSS 2019—Proceedings of the 32nd International Technical Meeting of the Satellite Division of the Institute of Navigation, 8551 Rixlew Lane Suite 360 Manassas, VA 20109, Sep. 20, 2019, pp. 2903-2915.

Gao, Z.; Fang, K.; Wang, Z.; Guo, K.; Liu, Y. An Error Overbounding Method Based on a Gaussian Mixture Model with Uncertainty Estimation for a Dual-Frequency Ground-Based Augmentation System. Remote Sens. 2022, 14, 1111. https://doi.org/ 10.3390/rs14051111, Jan. 22, 2022, 20 pages.

SYSTEMS, METHODS, AND MEDIA FOR CALCULATING AN OVERBOUND DISTRIBUTION, FROM A BASE MIXTURE DISTRIBUTION, THAT CAN BE USED WITH A SOLUTION-SEPARATION RAIM ALGORITHM

CROSS-REFERENCE TO RELATED APPLICATIONS

The present application claims the benefit of U.S. Provisional Patent Application Ser. No. 63/458,775, which was filed on Apr. 12, 2023, by Graeme Garner for SYSTEMS, METHODS, AND MEDIA FOR CALCULATING AN OVERBOUND DISTRIBUTION, FROM A BASE MIXTURE DISTRIBUTION, THAT CAN BE USED WITH A SOLUTION-SEPARATION RAIM ALGORITHM, which is hereby incorporated by reference.

BACKGROUND

Technical Field

The invention relates generally to navigation systems and solutions, and in particular, to systems, methods, and media for calculating an overbound distribution, from a base mixture distribution, that can be used with a solution-separation receiver autonomous integrity monitoring (RAIM) algorithm.

Background Information

Global navigation satellite system (GNSS) measurements are vulnerable to faults, which can potentially lead to major integrity threats when used with, for example, safety critical GNSS/inertial navigation system (INS) applications. To mitigate the impact of integrity threats, fault detection algorithms such as receiver autonomous integrity monitoring (RAIM) algorithms can be implemented.

The core principle of RAIM is to exploit redundant measurements to achieve self-contained fault detection at a navigation receiver. With the full deployment of GLONASS and with the emergence of Galileo and BeiDou, an increased number of redundant ranging signals becomes available for improving positioning accuracy and providing more possibilities for monitoring the integrity of a solution (e.g., position, velocity, and/or attitude (PVA)). However, multiple satellite faults can negatively affect the reliability of particular conventional RAIM algorithms that use a Chi-square test that is suitable for single failure identification.

To overcome this deficiency, a solution-separation RAIM algorithm can be utilized, for example, to handle multiple satellite faults in a safety critical GNSS/INS environment. Specifically, a module (e.g., a positioning engine) may implement the solution-separation RAIM algorithm by, for example, maintaining a set of N+1 solutions that is denoted by index $i \in \{0, 1, \ldots, N\}$ and where N is the total number of satellites. Each solution may use measurements from a different subset of the available satellites, with each satellite excluded from at least one subset. Each solution may represent the "true" solution under the fault hypothesis that one of the excluded satellites has a fault.

For example, solution 0 (i=0) may be the all-in-view (AIV) solution, which assumes there are no faults in any satellites in view. Each other solution (i>0) excludes at least one satellite, such that each satellite is excluded from at least one other solution. Each other solution (i>0) represents a hypothesis that there is a fault in one of the satellites excluded from that solution. Each solution's fault hypothesis can be assigned a probability of being true. The probability that each solution's hypothesis is true can be estimated using historical satellite fault data, thereby providing a set of probabilities $p_i$ for each solution, such that $\Sigma p_i = 1$. For any state x that the module (e.g., positioning engine) estimates (e.g., estimated PVA), the probability distribution of x can be represented (i.e., modelled) as a Gaussian mixture of the solution-separation components as follows:

$$F_{x(\epsilon)} \equiv P(x > \epsilon) = \sum_i p_i P(x_i > \epsilon),$$

where $x_i$ is the estimate of state x given by solution i, $\epsilon$ is an evaluation point of the Gaussian mixture, $p_i$ is the probability that the fault hypothesis of solution i is true, and $P(x_i > \epsilon)$ is the cumulative distribution function (CDF) of the estimate of state x in solution i, which can be interpreted as a Gaussian distribution, i.e., a component of the Gaussian mixture, with mean $\mu_i$ and standard deviation $\sigma_i$.

It can be beneficial to seed a positioning engine's estimation filters, e.g., INS filters or Kalman filters, by providing an initial estimate of the PVA state values and uncertainties. Seeding the INS filter at startup with good estimates of the current position and attitude, for example, can help convergence time, e.g., the time it takes to reach an accurate/reliable solution.

For a positioning engine maintaining a single solution (e.g., RAIM methods that use a Chi-square test), seeding is typically straightforward. Specifically, the positioning engine may implement the following steps for seeding:

Run the positioning engine to estimate the position and attitude states of a vehicle.

When the vehicle stops, save the state estimates and uncertainties.

When the vehicle re-starts, seed the filter with the previously saved position and attitude states.

However, for a positioning engine executing a solution-separation RAIM algorithm, there are at least the following two main complications with seeding:

1. Cannot seed each solution "one-to-one" because satellites contributing to each solution will change between key-cycles of a vehicle (and therefore the solution fault hypotheses are different); and
2. Cannot directly seed the solutions with the full Gaussian mixture because a typical implementation of a GNSS/INS navigation filter, e.g. Kalman filter, maintains an estimate of each state as a single Gaussian while the solution-separation RAIM algorithm represents each state as a multi-component Gaussian mixture.

With conventional systems, state estimates and variances, i.e., uncertainties, from the AIV solution may be stored, e.g., on non-volatile memory, for a previous power cycle so that they can be loaded in future cycles. However, the AIV solution assumes that there are no faults in the satellites that contribute to the AIV solution. As such, the AIV solution is not guaranteed to be safe and may be unsafe if, for example, there are satellite faults. As such, the AIV solution cannot be a guaranteed safe seed for a solution-separation RAIM algorithm.

Therefore, what is needed is a technique that overcomes the two above complications such that a Gaussian mixture can be used to determine a seed for a solution-separation algorithm that maintains the safety of the solution while also reducing convergence time.

SUMMARY

Techniques are provided for transforming a base distribution (e.g., Gaussian mixture) to a single overbounding Gaussian distribution that can be used to seed filter states for a solution-separation RAIM algorithm. Because a solution-separation RAIM algorithm is to provide "safe" state estimates, the single Gaussian calculated according to the one or more embodiments as described herein maintains the safety of the state estimates. Stated another way, the one or more embodiments as described herein calculate a single Gaussian distribution that is a safe representation of a Gaussian mixture such that it can be used as a seed estimate to a solution-separation RAIM algorithm.

In an embodiment, a particular distribution, hereinafter referred to as a single distribution, is defined as being safe relative to some base distribution (e.g., Gaussian mixture) if it is always more likely to have a given error for the single distribution than it is for the base distribution (i.e., the single distribution is always more pessimistic than the base distribution). Stated another way, a single distribution is safe relative to some base distribution if the probability of the distribution variable taking a value that is at least $\varepsilon$ away from the median is always larger for the single distribution than it is for the base distribution for every value of E.

In an embodiment, a single distribution being safe relative to a base distribution may be known as an overbounding distribution. The cumulative distributive function (CDF) of an overbounding distribution is always (1) less than the CDF of the base distribution for E greater than the base distribution median, and (2) greater than the CDF of the base distribution for E less than the base distribution median.

The one or more embodiments as described herein determine an overbound distribution that is a "tight" fit to the base distribution. A tight overbound distribution is identified by determining the smallest possible standard deviation of an overbounding distribution relative to the base distribution. By using a tightly overbound distribution for seeding, for example, the one or more embodiments as described herein minimize convergence time. The smallest possible standard deviation of an overbounding distribution, such that it is a tight fit to a base distribution (e.g., a Gaussian mixture), may be determined using the following iterative approach:

1. Starts at $\varepsilon=0$
2. Calculates a step size $\Delta\varepsilon$ which guarantees the single distribution overbounds the mixture distribution in the region $[\varepsilon, \min(\varepsilon+\Delta\varepsilon, \varepsilon_{crit})]$.
3. If the step size is small, then the overbounding conditions will not hold, so the single distribution standard deviation value is increased to the smallest possible value that meets a minimum step size threshold.
4. The iteration is updated ($\varepsilon+=\Delta\varepsilon$) and steps 2-3 are repeated until a critical point is hit ($\varepsilon_{crit}$) after which it is guaranteed that the overbounding conditions hold for all remaining $\varepsilon>\varepsilon_{crit}$.

According to the one or more embodiments as described herein, polynomial bounds are used for the single distribution and base distribution of step 2 in the iterative approach to determine $\Delta\varepsilon$.

Working with Gaussian CDFs can be computationally intensive and there are no closed-form solutions to identify intersections between the Gaussian mixture CDF and the single CDF. To address this in a computationally efficient way, the one or more embodiments as described herein can calculate a second-order polynomial of the base distribution that lower-bounds the base distribution, e.g., Gaussian mixture, and a first-order polynomial of the single distribution that upper-bounds the base distribution. The step size, e.g., $\Delta\varepsilon$, can be determined as the intersection between the lower and upper bounds using the quadratic equations. Since the lower and upper bounds are known to not intersect on $[\varepsilon, \varepsilon+\Delta\varepsilon]$, it also holds true that the base distribution and single distribution do not intersect (such that the "safe" condition is satisfied).

The single safe Gaussian, i.e., valid distribution, determined by the solution-separation RAIM solutions according to the one or more embodiments as described herein satisfies the following criteria:

1. The calculated single distribution is a guaranteed overbound for the Gaussian mixture of solution-separation RAIM solutions;
2. The single distribution is a tight overbound (i.e. the minimum standard deviation overbound); and
3. The single distribution is computed in an efficient manner based on the one or more embodiments as described herein.

In an embodiment, an INS filter (e.g., Kalman filter) may use the single safe Gaussian as an initial estimate of a PVA state value. By using the single safe Gaussian as an initial estimate, the one or more embodiments as described herein provide an improvement over conventional systems that may utilize an AIV solution that is not guaranteed to be a safe solution.

Additionally, using the minimum standard deviation overbound as the single safe Gaussian reduces convergence time when compared to conventional systems that, for example, may utilize an overly pessimistic single distribution (i.e., seed) for the filter states. Even more, calculating the single safe Gaussian as described herein is more efficient, e.g., utilizes less processing resources, when compared to conventional systems that may calculate a seed utilizing a brute-force technique.

Based on the above-described advantages, the one or more embodiments as described herein provide an improvement in the existing technological field of navigation systems and solutions. Further, because processing resources can be conserved when compared to conventional systems, the one or more embodiments as described herein also provide an improvement to the computer, e.g., the receiver including and executing the INS (e.g., Kalman) filter, itself.

Even more, because the single overbound distribution that tightly fits a base distribution can be identified and used to seed filter states for a filter that may operate in safety critical environments, the single overbound distribution as described herein is integrated in the practical application associated with navigation filters. Stated another way, the identification and use of the single overbound distribution according to the one or more embodiments as described herein, with the above described improvements, constitutes a practical solution for navigation filters that determine navigation solutions in, for example, safety critical environments.

BRIEF DESCRIPTION OF THE DRA WINGS

The description below refers to the accompanying drawings, of which:

Figure 1A:
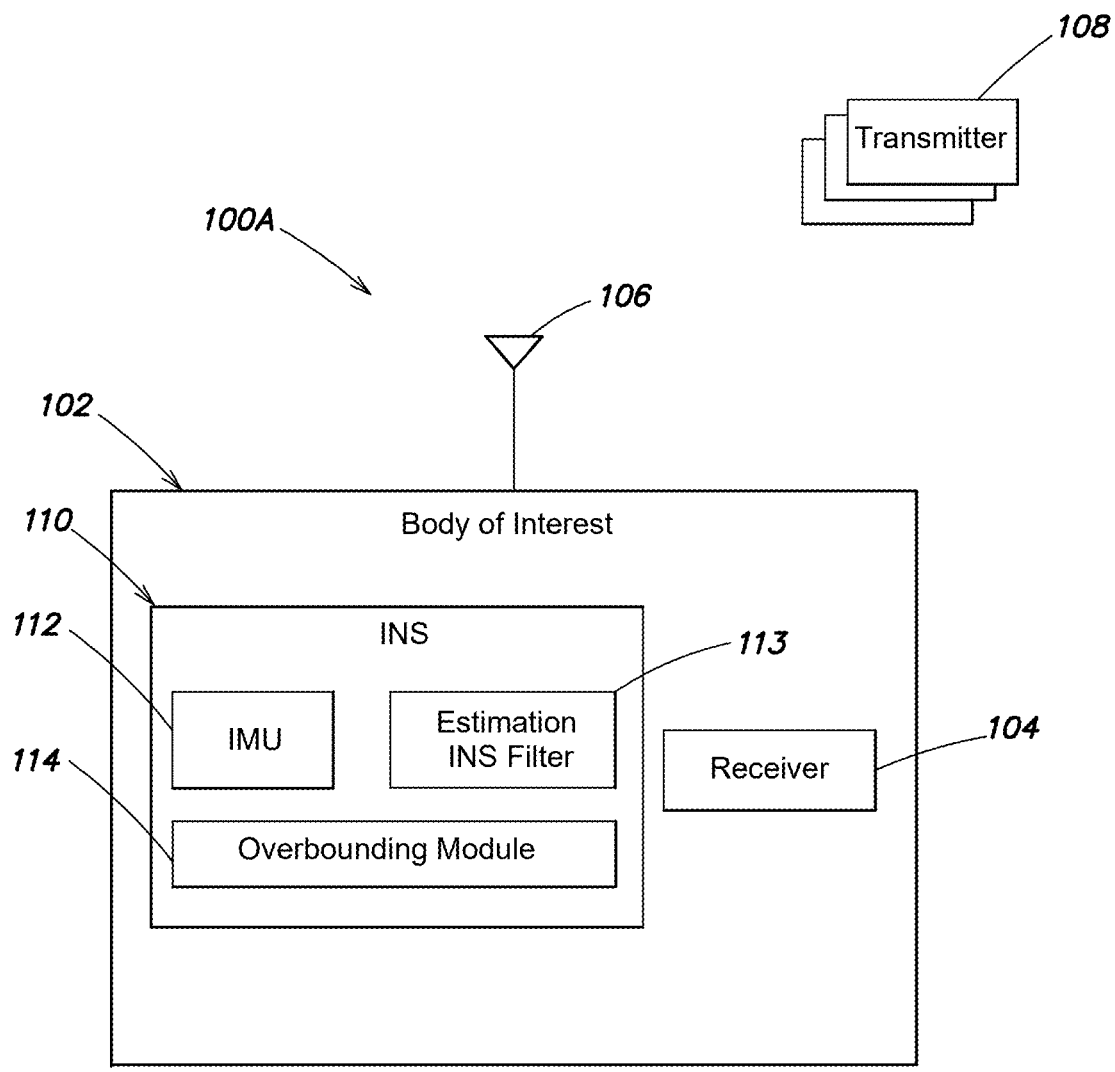
FIG. 1A is an illustration of an example system environment for transforming a base distribution to a single overbounding distribution that can be used to seed filter states for a solution-separation RAIM algorithm according to the one or more embodiments described herein.
Figure 1B:
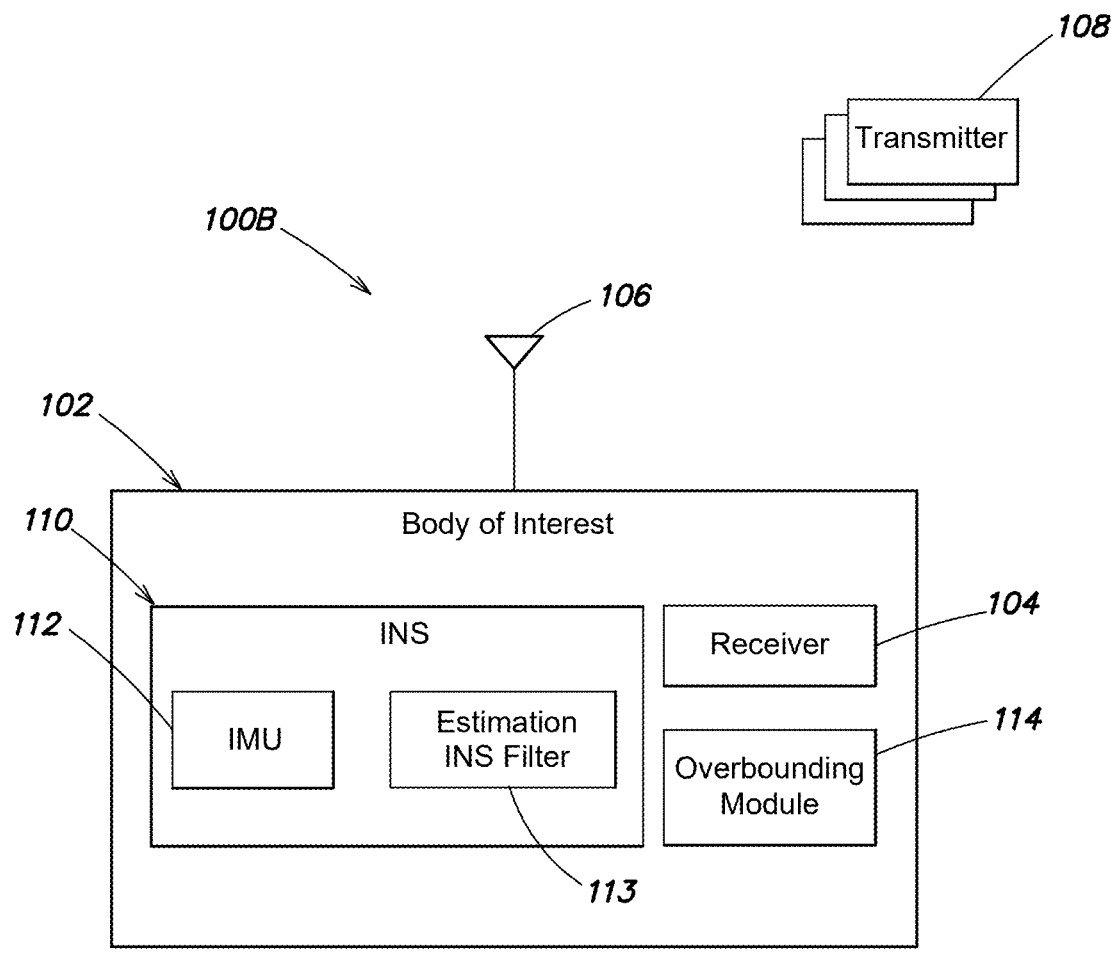
FIGS. 1B and 1C depict different example system environments, respectively, for transforming a base distribution to a single overbounding distribution that can be used to seed filter states for a solution-separation RAIM algorithm according to the one or more embodiments as described herein.
Figure 1C:
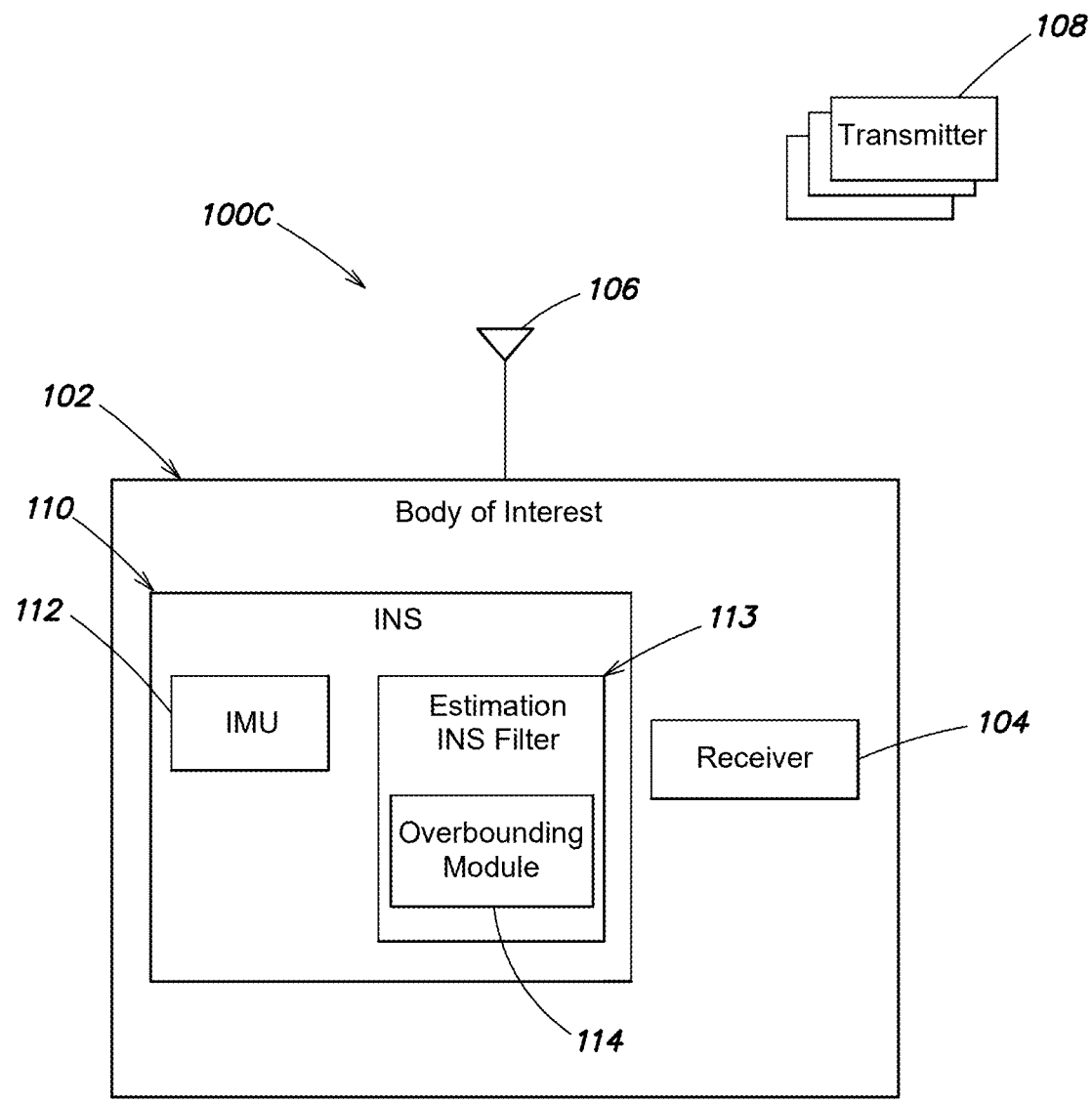
Figure 1D:
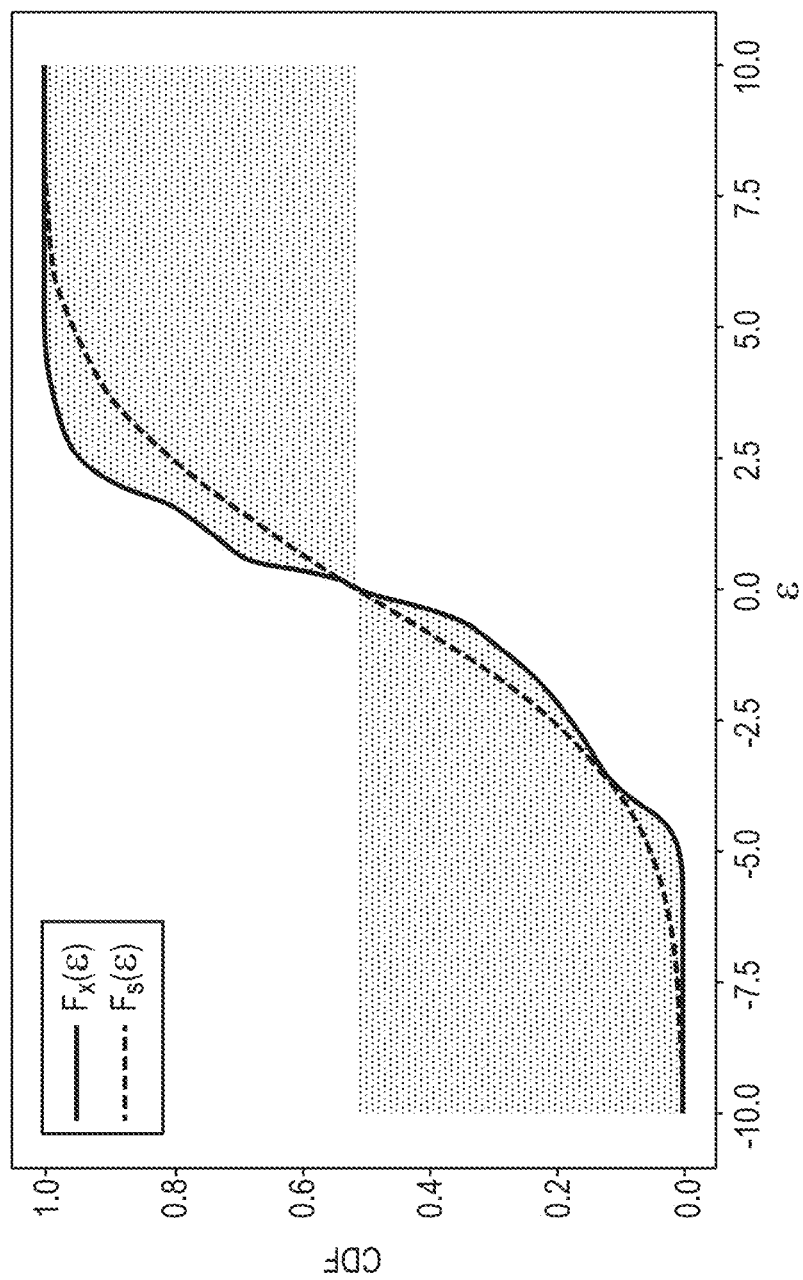
Figure 2:
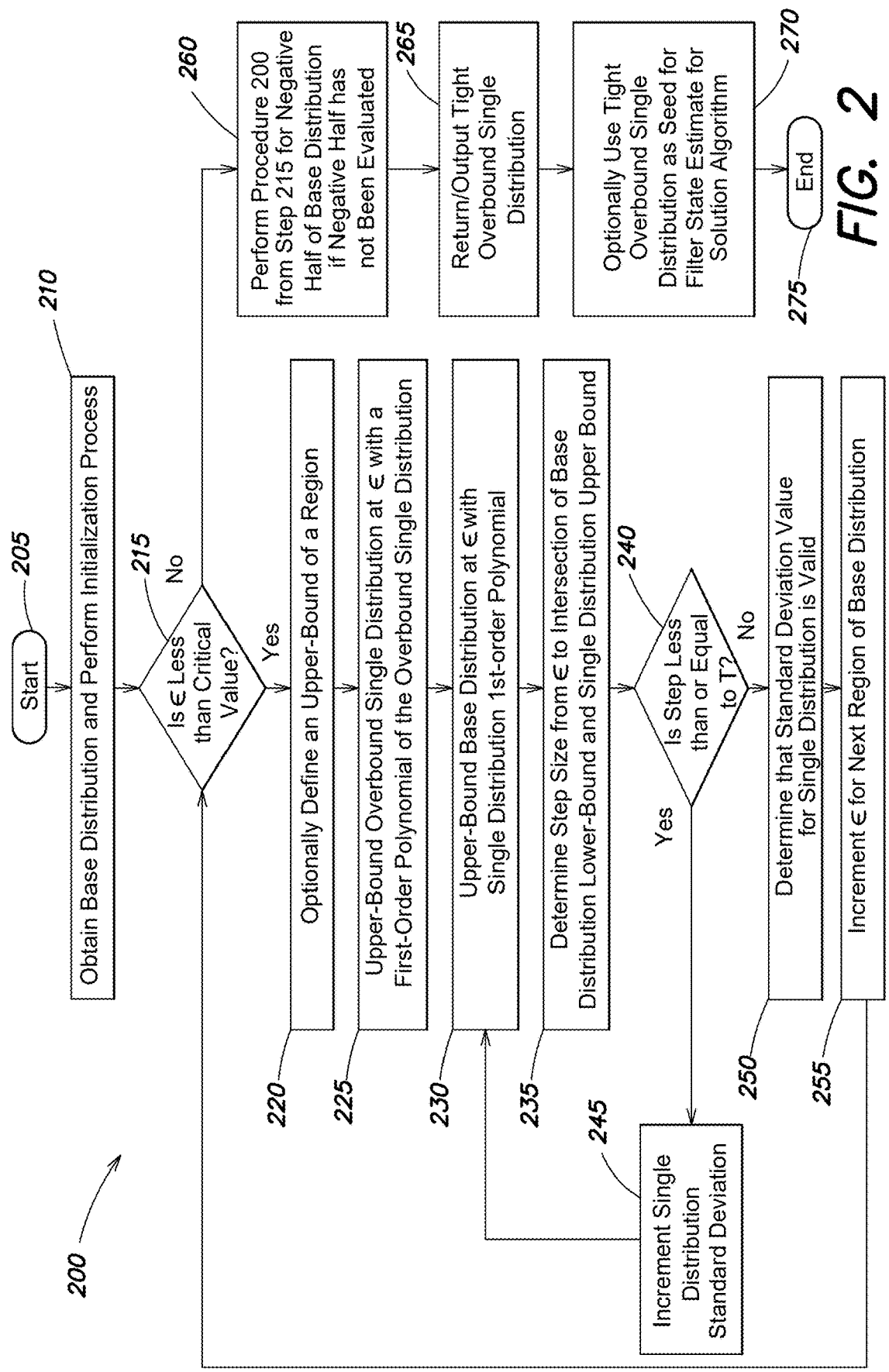

FIG. 1D is a plot that includes a base distribution and its corresponding tightly-fitting overbound distribution according to the one or more embodiments as described herein; and FIG. 2 is a flow diagram of a sequence of steps for calculating a single overbounding distribution, from a base distribution, that can be used to seed a filter state for a solution-separation RAIM algorithm according to the one or more embodiments as described herein.

DETAILED DESCRIPTION OF AN ILLUSTRATIVE EMBODIMENT

FIG. 1A is an illustration of an example system environment 100A for transforming a base distribution (e.g., Gaussian mixture) to a single overbounding distribution (e.g., a single Gaussian) that can be used to seed filter states for a solution-separation RAIM algorithm according to the one or more embodiments as described herein. System environment 100A includes a body of interest 102, e.g., a moving vehicle, a stationary object, etc. Coupled to the body of interest 102 may be a receiver 104, an inertial navigation system (INS) 110, and an antenna 106. The antenna 106, coupled to the body of interest 102 and in communication with receiver 104, may receive one or more signals from one or more transmitters 108.

In an embodiment, the one or more transmitters 108 may be one or more Global Navigation Satellite System (GNSS) satellites that transmit one or more navigation signals, e.g., GNSS satellite signals (not shown). Although reference may be made to transmitters 108 being GNSS satellites transmitting GNSS satellite signals, it is expressly contemplated that the one or more embodiments as described herein may be utilized with any of a variety of different types of transmitters 108. For example, transmitters 108 may be terrestrial transmitters that transmit any of a variety of different navigation signals. As such, the description of transmitters 108 being GNSS satellites that transmit GNSS signals should be taken for illustrative purposes only.

Receiver 104 may, based on the reception of signals at the antenna 106, produce raw measurements (e.g., GNSS raw measurements), such as pseudoranges, carrier phases, and Doppler velocities; position (e.g., GNSS position), velocity (e.g., GNSS velocity), attitude, and time (e.g., GNSS time), position covariance, time covariance, and velocity covariance; and, as appropriate, GNSS observables.

The INS 110 includes an inertial measurement unit (IMU) 112 that reads data from sensors (e.g., one or more accelerometers and/or gyroscopes) that produce IMU measurements. In an embodiment, the sensors may be orthogonally positioned. Each of the INS filters 113 processes the IMU measurements to compute INS based position, velocity, and/or attitude (PVA). Additionally, the INS filter 113 may process, in a known manner, the GNSS data, when available, and the IMU measurements to produce GNSS/INS based PVA. The computed GNSS/INS PVA may be referred to as a GNSS/INS solution or solution according to the one or more embodiments as described herein. The process of obtaining an accurate/stable GNSS/INS solution at, for example, startup, may be referred to as convergence. The time it takes to obtain an accurate/stable GNSS/INS solution may be referred to as convergence time.

In an embodiment, the INS filter operates as a Kalman filter, extended Kalman filter, unscented Kalman filter, particle filter, or any other type of probabilistic state estimation filter. In an embodiment, the INS filter 113 executes a solution-separation receiver autonomous integrity monitoring (RAIM) algorithm that may operate in a safety critical GNSS/INS environment.

The INS 110 may also include an overbounding module 114 that implements the one or more embodiments as described herein. Specifically, and as will be described in further detail below, the overbounding module 114 transforms a base distribution (e.g., Gaussian mixture) to a single overbounding distribution (e.g., a single Gaussian) that can be used to seed filter states of the solution-separation RAIM algorithm implemented by INS filter 113. For example, the single overbounding distribution can be used to seed filter states of the solution-separation RAIM algorithm during start-up and after an object (e.g., vehicle) has stopped such that convergence can be achieved at start-up. By seeding the solution-separation RAIM algorithm with the overbounding distribution determined according to the one or more embodiments as described herein, a safe single distribution can be used as a seed for a filter state while also minimizing convergence time. After convergence is achieved based on the execution of the RAIM algorithm by INS filter 113 during start-up, the overbounding module 114 may store the Gaussian mixture generated based on the execution of the RAIM algorithm at start-up and during convergence. For example, the Gaussian mixture may be stored in volatile or non-volatile memory, external storage, etc. (not shown).

Thereafter, and during a next start-up, the overbounding module 114 may utilize the saved Gaussian mixture to calculate a single overbounding distribution from the saved Gaussian mixture. The single overbounding distribution can be used as a seed for a filter state for the solution-separation RAIM algorithm executed during the next start-up such that convergence is achieved for the next start-up. As such, the overbounding module 114 may repeatedly store the generated Gaussian mixture such that it can be used to calculate a single overbounding distribution that can be used as a seed for a filter state of the solution-separation RAIM algorithm executed during the next start-up to achieve optimal convergence, e.g., determining an accurate/reliable navigation solution in a time period that is reduced when compared to a solution that does not use an initial seed.

In an embodiment, the overbounding module 114 may be hardware, software, or a combination of hardware and software. In an embodiment, the overbounding module 114 is executed by a processor (not shown). Further, the receiver 104, INS 110, and IMU 112 may include processors, memory, storage, other hardware, software, and/or firmware (not shown).

FIGS. 1B and 1C depict different example system environments 100B and 100C, respectively, for transforming a base distribution to a single overbounding distribution that can be used to seed filter states for a solution-separation RAIM algorithm according to the one or more embodiments as described herein. FIG. 1B is similar to FIG. 1A, however the overbounding module 114 of FIG. 1B is external to the INS 110 and coupled to the body of interest 102. FIG. 1C is also similar to FIG. 1A, however the overbounding module 114 of FIG. 1C is internal to the INS filter 113.

According to the one or more embodiments as described herein, each seed state x may be determined as a single Gaussian random variable. To be "safe", the single distribution must be more pessimistic than the underlying solution-separation Gaussian mixture, i.e., base distribution. To define "safe" mathematically, the one or more embodiments as described herein may, for each state x (with CDF $F_x(\epsilon)$), find a single distribution $N(\mu_s, \sigma_s)$ with CDF $F_s(\epsilon)$ such that:

1. $F_s(\epsilon) \geq F_x(\epsilon) \; \forall \; \epsilon < \mu_s$
2. $F_s(\epsilon) \leq F_x(\epsilon) \; \forall \; \epsilon > \mu_s$ The two conditions ensure a pessimistic distribution since the probability of a negative error is greater for all negative errors, and the probability of a positive error is greater for all positive errors. Any distribution $x_s$ (e.g., single distribution) that meets these conditions is known as an overbounding distribution of a base distribution x (e.g., Gaussian mixture). However, an infinite number of overbounding distributions (e.g., pessimistic distributions) exist for any given base distribution.

According to the one or more embodiments as described herein, an overbounding distribution that tightly fits the base distribution is identified utilizing a determined standard deviation for the overbounding distribution. Identifying a tightly fitting overbounding distribution that can be used for seeding, for example, results in the reduction of convergence time when, for example, compared to conventional systems that may utilize an overly pessimistic seed.

FIG. 1D is a plot that includes a base distribution and its corresponding tightly-fitting overbound distribution. As depicted in FIG. 1D, for some Gaussian mixture distribution $F_x$ (the solid line), $F_s$ (dashed line) is an overbounding distribution if it upper-bounds $F_x$ when $\epsilon < \mu_s$, and lower-bounds $F_x$ when $\epsilon > \mu_s$, where $\mu_s$ is the mean of the single overbound distribution and in this example may be a value 0. Visually, $F_s$ overbounds $F_x$ if it lies entirely in the shaded (e.g., gray) region of FIG. 1D.

From the definitions provided above for the overbounding distribution, the overbound Gaussian mean ($\mu_s$) must be the Gaussian mixture median. However, there is not a direct relationship between the overbound Gaussian standard deviation ($\sigma_s$) and the Gaussian mixture component standard deviations.

Further, there are infinitely many standard deviations that will overbound any given Gaussian mixture. However, and according to the one or more embodiments as described herein, a minimum overbound standard deviation is identified/determined for the base distribution such that the minimum overbound distributions can be used for initial state estimates such that seeding results in reduced convergence time while still guaranteeing safety (i.e., overbounding) of the state estimates.

Based on the above, the single distribution for the solution-separation RAIM algorithm executed by INS filter 113 according to the one or more embodiments as described herein is (1) a single distribution that is an overbound of the solution-separation Gaussian mixture for each state, (2) a single distribution that uses a minimum overbound standard deviation or a sufficiently close estimate to the minimum overbound standard deviation, and (3) a minimum overbound distribution that is calculated efficiently when compared to, for example, a brute-force approach.

FIG. 2 is a flow diagram of a sequence of steps for calculating a single overbound distribution, from a base distribution (e.g., Gaussian mixture), that can be used to seed a filter state for a solution-separation RAIM algorithm according to the one or more embodiments as described herein. It is expressly contemplated that base distribution, base mixture distribution, mixture distribution, and multi-component distribution may be used interchangeably. Each of base distribution, base mixture distribution, mixture distribution, and multi-component distribution may be a distribution model or distribution curve that represents a mixture of a plurality of components. For example, a Gaussian mixture (i.e., a multi-component Gaussian mixture) may be a type of base distribution, a base mixture distribution, a mixture distribution, or a multi-component distribution according to the one or more embodiments as described herein. Specifically, the Gaussian mixture may represent a mixture of a plurality of single Gaussians.

Further, it is expressly contemplated that seed distribution, single overbounding distribution, safe seed distribution, and single seed distribution may be used interchangeably. Each of a seed distribution, a single overbounding distribution, a safe seed distribution, or a single seed distribution may be a distribution model or distribution curve that represents a single component/distribution that minimally overbounds a base distribution according to the one or more embodiments as described herein. For example, a single Gaussian may be a type of seed distribution, single overbounding distribution, safe seed distribution, or single seed distribution that overbounds a base distribution.

The procedure 200 starts at step 205 and continues to step 210 where the overbounding module 114 obtains a base distribution and performs an initialization process. In an embodiment, the base distribution is a Gaussian mixture that is defined by $$\{(p_i, \mu_i, \sigma_i)\}_{i=0}^N,$$

where i is a solution, $p_i$ is a probability that the fault hypothesis of the solution i is true, $\mu_i$ is a mean of the Gaussian mixture component for solution i, $\sigma_i$ is a standard deviation of the Gaussian mixture component for solution i, and N is the number of different solutions. In an embodiment of the initialization process 210, the Gaussian mixture may be normalized by dividing $\mu_i$ and $\sigma_i$ by the AIV (i=0) standard deviation. In an embodiment, the Gaussian mixture has a zero median. The overbounding module 114 may calculate the median of the Gaussian mixture and subtract the median from each mixture component of the Gaussian mixture such that the Gaussian mixture has a zero median.

In an embodiment, the overbounding module 114 may perform the initialization process by setting the initial evaluation point ($\epsilon$) to 0, determining the single distribution mean ($\mu_s$), and determining the single distribution standard deviation ($\sigma_s$). The overbounding module 114 may calculate $\mu_s$ as the median of the Gaussian mixture, e.g., $\mu_s$=median $(\{(p_i, \mu_i, \sigma_i)\}_{i=0}^N)$. Further, the overbounding module 114 may initialize $\sigma_s$ as follows:

$$\sigma_s = \max(\sigma_i) + \delta$$

where $\delta$ is some small number so that the tail bound is finite. In an embodiment, the normal (N) single distribution is $N(\mu_s, \sigma_s)$. As will be described in further detail below, $\sigma_s$ is determined for a sequence of intervals (e.g., regions of the base distribution) based on a determined intersection of a second-order polynomial lower-bound of the base distribution and a first-order polynomial upper-bound of the single distribution. Because $\sigma_s$ is adjusted and determined based on the intersection, the single distribution (e.g., $\mu_s$, $\sigma_s$) is tightly overbound in relation to the base distribution.

The initialization process may also include defining an imminent intersection threshold (T). Specifically, T may be utilized to ensure that an imminent intersection between the single distribution and the base distribution is avoided. Therefore, T may be a minimum step size that guarantees that the single distribution overbounds the base distribution for all regions of the base distribution. For example, and as will be described in further detail below, a step size may be calculated for a region based on an intersection determined for the second-order polynomial and the first-order polynomial. Although this step size may guarantee that the single distribution overbounds the base distribution for a current region, the single distribution may cross (e.g., become greater than) the base distribution at a location that is in close proximity to the intersection. This in turn may prevent the overbounding condition from holding true for other regions, e.g., regions that directly follow the current region and are in close proximity to the imminent crossing of the single distribution and base distribution. As such, T may be set to a minimum step size to ensure that an imminent crossing of the single distribution and the base distribution does not exist such that the single distribution is guaranteed to overbound the base distribution for all regions.

The procedure continues to step 215 and the overbounding module 114 determines if $\epsilon$ is less than or equal to a critical value ($\epsilon_{crit}$). In an embodiment $$\epsilon_{crit} = \frac{\mu_i \sigma_s}{\sigma_s - \sigma_i},$$

where $\mu_i$ and $\sigma_i$ are, respectively, the maximum values over all subsets of i. In an embodiment, $\epsilon_{crit}$ may be selected or predefined. For example, $\epsilon_{crit}$ may be selected such that the base-distribution probability of $\epsilon > \epsilon_{crit}$ is small enough to be considered irrelevant to the application. For example, $\epsilon_{crit}$ for the plot of FIG. 1D may be 7.5 if the application requires a "safe" solution with a probability of failure less than $10^{-7}$. Specifically, and as depicted in the plot of FIG. 1D, the base distribution "levels out" to P ($x>\epsilon$)$<10^{-7}$ for values of $\epsilon>7.5$. Therefore, if the single distribution is determined to overbound the base distribution for all values up to $\epsilon=7.5$, the single distribution will achieve the application requirements of a "safe" distribution with probability of failure less than $10^{-7}$. In this example, let it be assumed that $\epsilon$ is a value of 0 and $\epsilon_{crit}$ is a value of 4.0. Therefore, $\epsilon$ is less than $\epsilon_{crit}$ and the procedure continues from step 215 to step 220.

At step 220, the overbounding module 114 optionally defines an upper bound of a region (i.e., search region). In an embodiment, the upper bound may be based on a maximum step size ($\Delta\epsilon_{max}$). $\Delta\epsilon_{max}$ may be predefined or selected based on system design, constraints, and/or user selection. In an embodiment, $\Delta\Sigma_{max}$ may be used to define an upper parameter of the search region for which a standard deviation value is determined such that the overbound condition is satisfied for the search region. As will be described in further detail below, the standard deviation value is determined for each of a plurality of regions, i.e., search regions, such that overbounding condition is satisfied for the entire base distribution.

If $\Delta\epsilon_{max}$ is defined at step 220 or step 220 is not performed, the procedure continues to 225. At step 225, the overbounding module 114 lower-bounds the base distribution at E with a second-order polynomial of the base distribution. In an embodiment, the polynomial coefficients for the second-order polynomial are:

$$F(\epsilon_0), \dot{F}(\epsilon_0), \frac{1}{2}\ddot{F}_{min}(\epsilon_0, \epsilon_1)$$

where $F(\epsilon_0)$ is a value of the base distribution at $\epsilon_0$, $\dot{F}(\epsilon_0)$ is a value of the first derivative of the base distribution at $\epsilon_0$, and $\ddot{F}_{min}(\epsilon_0, \epsilon_1)$ is the minimum value of the second derivative, of the base distribution, over a bounded region (i.e., search region) between $\epsilon_0$ and $\epsilon_1$, where $\epsilon_0$ may represent a lower bound of the bounded region and $\epsilon_1$ may represent an upper bound of the bounded region. In an embodiment $$\frac{1}{2}\ddot{F}_{min}(\epsilon_0, \epsilon_1)$$

is the second-order coefficient for the second-order polynomial.

In an embodiment, $(\epsilon_0, \epsilon_1) = (\epsilon, \epsilon+\Delta\epsilon_{max})$. In this example, $\epsilon$ is 0. Therefore, the bounded region would be $(0, 0+\Delta\epsilon_{max})$. If $\Delta\epsilon_{max}$ is not defined at step 220, then the $(\epsilon_0, \epsilon_1)$ may be equal to $(\epsilon, \epsilon_{crit})$. Therefore, the bounded region in this example would be $(\epsilon_0, \epsilon_{crit})$. Although the example as described herein uses $\Delta\epsilon_{max}$ or $\epsilon_{crit}$ to define the upper bound of the bounded region, it is expressly contemplated that any of a variety of different values can be used for the upper bound and/or any of a variety of different techniques may be utilized to determine the upper bound. As such, the reference to $\Delta\epsilon_{max}$ or $\epsilon_{crit}$ to define the upper bound of the bounded region is for illustrative purposes only.

In an embodiment, the overbounding module 114 may determine a minimum value of the second derivative, for each solution component (i) of the Gaussian mixture, over a bounded region (i.e., search region) between $\epsilon_0$ and $\epsilon_1$. The overbounding module 114 may then sum the minimum values determined for the solution components of the Gaussian mixture to determine the minimum value of the second derivative for the base distribution over the bounded region, e.g., $\ddot{F}_{min}(\epsilon_0, \epsilon_1)$. In an embodiment, the overbounding module 114 determines a minimum value of a second derivative for a solution component (i) of the Gaussian mixture over the bounded region utilizing the following steps:

if $(\mu_i + \sigma_i) < \epsilon_0$:             (1)

$$\ddot{F}_{min(i)}(\epsilon_0, \epsilon_1) = \ddot{F}_{(i)}(\epsilon_0)$$

where $\mu_i$ is the mean value for solution component i of the Gaussian mixture, $\sigma_i$ is the standard deviation value for solution component i of the Gaussian mixture, $\ddot{F}_{min(i)}(\epsilon_0, \epsilon_1)$ is a minimum value of the second derivative for the solution component i of the Gaussian mixture over a bounded region between $\epsilon_0$ and $\epsilon_1$, and $\ddot{F}_{(i)}(\epsilon_0)$ is a value of the second order derivative for the solution component i at $\epsilon_0$. This condition determines that when the minimum negative peak value (e.g., $\mu_i+\sigma_i$) of the second order derivative for the solution component i is before region $(\epsilon_0, \epsilon_1)$, the minimum value for region $(\epsilon_0, \epsilon_1)$ of the second order derivative for the solution component i is the value of the second order derivative for the solution component i at $\varepsilon_0$.

$$\text{else if } (\mu_i + \sigma_i) > \varepsilon_0 \text{ AND } (\mu_i + \sigma_i) < \varepsilon_1: \quad (2)$$

$$\ddot{F}_{min(i)}(\varepsilon_0, \varepsilon_1) = \ddot{F}_{(i)}(\mu_i + \sigma_i)$$

This condition determines that when the minimum negative peak value (e.g., $\mu_i+\sigma_i$) of the second order derivative for the solution component i is inside $(\varepsilon_0,\varepsilon_1)$, the minimum value of the second order derivative for the solution component i for region $(\varepsilon_0,\varepsilon_1)$ is the minimum negative peak value of the second order derivative for the solution component i.

$$\text{else if } \mu_i > \varepsilon_1: \quad (3)$$

$$\ddot{F}_{min(i)}(\varepsilon_0, \varepsilon_1) = 0$$

This condition determines that when the mean value of the second order derivative for the solution component i is greater than $\varepsilon_1$, then the second-order derivative for the solution component i is strictly positive in region $(\varepsilon_0,\varepsilon_1)$. As such, the minimum value of the second order derivative for the solution component i for region $(\varepsilon_0,\varepsilon_1)$ is 0.

$$\text{else:} \quad (4)$$

$$\ddot{F}_{min(i)}(\varepsilon_0, \varepsilon_1) = \ddot{F}_{(i)}(\varepsilon_1)$$

This condition determines that the second-order derivative for the solution component i might be negative in region $(\varepsilon_0,\varepsilon_1)$, but the extreme is to the right of region $(\varepsilon_0,\varepsilon_1)$. If so, then the minimum value of the second order derivative for the solution component i for region $(\varepsilon_0,\varepsilon_1)$ is the value of the second derivative for the solution component i at $\varepsilon_1$.

The overbounding module 114 may sum the $\ddot{F}_{min(i)}(\varepsilon_0, \varepsilon_1)$ for all of the components of the Gaussian mixture to determine $\ddot{F}_{min}(\varepsilon_0, \varepsilon_1)$ for the Gaussian mixture.

The procedure continues to step 230 and the overbounding module 114 upper-bounds the overbound single distribution at $\varepsilon$ with a first-order polynomial of the overbound single distribution. In an embodiment, the polynomial coefficients for the first-order polynomial are:

$$F_s(\varepsilon_0), \dot{F}_s(\varepsilon_0)$$

where $F_s(\varepsilon_0)$ is a value of the single distribution (e.g., $(\mu_s, \sigma_s)$) at $\varepsilon_0$ and $\dot{F}_s(\varepsilon_0)$ is a value of the first derivative of the single distribution at $\varepsilon_0$.

The procedure continues to step 235 and the overbounding module 114 determines the step-size $(\Delta\varepsilon_{int})$ from $\varepsilon$ to the intersection of the base-distribution lower-bound and the single distribution upper-bound. The intersection may be determined utilizing any of a variety of different techniques that can determine the intersection of at least two functions. As an example, let it be assumed that the intersection is determined to be at $\varepsilon=0.41$. As such, $\Delta\varepsilon_{int}$ equals 0.41 since $\varepsilon$ is 0. According to the one or more embodiments as described herein, the point at which the base-distribution lower-bound and the single distribution upper-bound intersect defines a region $[\varepsilon_0, \varepsilon_0+\Delta\varepsilon_{int}]$ where the single distribution is guaranteed to overbound the base distribution.

The procedure continues to step 240 and the overbounding module 114 determines if the steps size $(\Delta\varepsilon_{int})$ is less than or equal to T. If $\Delta\varepsilon_{int}$ is less than or equal to T, the overbounding module 114 determines that a crossing of the single distribution and base distribution (e.g. a violation of the safety condition) is imminent. If a crossing is imminent, the overbounding module 114 determines that the overbound condition may not hold true for other regions of the single distribution in relation to the base distribution, e.g., other regions that follow the current region being evaluated and that are in close proximity to the imminent crossing. As such, the procedure continues from step 240 to step 245 and the overbounding module 114 increments $\sigma_s$. The procedure then reverts to step 230 to again upper bound the base distribution based on incremented $\sigma_s$. This in turn results in determining an increased $\Delta\varepsilon_{int}$ that avoids an imminent crossing of the single distribution and base distribution. This loop is repeated until $\Delta\varepsilon_{int}$ is greater than T. In an embodiment, $\sigma_s$ is incremented at step 245 using a variant of a half-interval search to determine a smallest $\sigma_s$ that ensures that $\varepsilon_{int}$ is greater than T.

For this example, let it be assumed that T is a value of 0.40. As discussed above in relation to the example base distribution, $\Delta\varepsilon_{int}$ equals 0.41 since $\varepsilon$ is 0. Therefore, and in this example, $\Delta\varepsilon_{int}$ is greater than T. When $\Delta\varepsilon_{int}$ is greater than T, the procedure continues from step 240 to step 250 and overbounding module 114 determines that $\sigma_s$ is valid. Specifically, if $\Delta\varepsilon_{int}$ is greater than T, the overbounding module 114 determines that there is no imminent crossing of the seed distribution and the base distribution. Because no crossing is imminent, $\sigma_s$ does not have to be incremented to increase $\Delta\varepsilon_{int}$. That is, because $\Delta\varepsilon_{int}$ is greater than T, the overbounding module 114 ensures that an imminent crossing of the single distribution and the base distribution does not exist such that the single distribution is guaranteed to overbound the base distribution for other regions of the base distribution, e.g., other regions after the current region being evaluated. In this example, the overbounding module 114 determines that $\sigma_s$ is valid from 0 to 0.41 for $\varepsilon$ of the base distribution.

The procedure then continues to step 255 and the overbounding module 114 increments e for a next evaluation point of the base distribution to be evaluated to ensure that the single distribution overbounds a next region of the base distribution. In an embodiment, the overbounding module increments E to a value that is the sum of the current value of $\varepsilon$ (e.g., 0) plus a minimum of $\Delta\varepsilon_{int}$ and $\Delta\varepsilon_{max}$. The procedure then reverts to step 215, and the procedure 200 repeats for the next evaluation point such that the overbounding module 114 can determine the overbound distribution from the next evaluation point (e.g., 0.41) to the next $\Delta\varepsilon_{int}$. As such, the overbounding module 114 can increment $\sigma_s$ for the single distribution based on an evaluation of each of a plurality of different regions (e.g., from the currently evaluated e to the currently determined $\varepsilon_{int}$) that define the base distribution until the critical value is reached. Therefore, the final determined (i.e., incremented) $\sigma_s$ ensures that the single distribution is a tight overbound of the entire base distribution.

After the critical value is reached at step 215 (e.g., e is equal to or greater than the critical value), the procedure continues from step 215 to step 260. At step 260, the overbounding module 114 performs procedure 200, starting at step 215, for the negative half of the base distribution if the negative half of the base distribution has not been evaluated. In an embodiment, the overbounding module 114 may mirror the base distribution about the y-axis and perform procedure 200 starting at step 215.

The procedure continues from step 260 to step 265 and the tight overbound single distribution (e.g., $\mu_s$, $\sigma_s$) is returned and/or output. Specifically, $\mu_s$ may be a value determined during the initialization process at step 210. Further, $\sigma_s$ may be a value that is incrementally adjusted based on determined intersections of the base distribution lower-bound and single distribution upper bound at different regions of the base distribution.

The procedure optionally continues to step 270 and the overbounding module 114 provides the tight overbound single distribution, determined according to the one or more embodiments as described herein, to a solution algorithm for use in determining a solution. For example, the overbounding module 114 may provide the tight overbound single distribution to the INS filter 113. The INS filter 113 may use the tight overbound single distribution as an initial estimate (i.e., seed) of a filter state for a solution algorithm that may be, for example, the solution-separation RAIM algorithm executed by the INS filter 113. The procedure then ends at step 275. Although the examples herein may describe the tight overbound distributing being utilized for seeding a solution-separation RAIM algorithm, it is expressly contemplated that the tightly overbound distribution determined according to the one or more embodiments as described herein may be utilized for any of a variety of different purposes. Specifically, the tightly overbound distribution may be utilized for any navigation solution, by any of a variety of different navigation filters, etc.

For example, the tight overbound distribution determined according to the one or more embodiments as described herein can be utilized to determine a "zone of confidence." Specifically, the tight overbound distribution can be utilized to determine an area (e.g., an ellipsoid) that is the "zone of confidence" and represents a particular confidence (e.g., 99.999%) in a navigation solution. If the "zone of confidence" falls entirely within a region of interest to a user, e.g., a region between lane markings, then the user can have confidence that an object of interest (e.g., vehicle) is located within that region. Conversely, if the "zone of confidence" does not fall within the region of interest, the user knows that there is low confidence that the object of interest is located in the region of interest and can respond accordingly, e.g., automatic brakes, alarm, etc.

Further, the tight overbound distribution is a single distribution and can thus be represented by two parameters. This is in contrast to a Gaussian mixture which requires 3*N parameters where N represents the number of components of the Gaussian mixture. Because less parameters are needed to represent the tight overbound distribution, transmission of the tight overbound distribution is more efficient when compared to transmitting the Gaussian mixture (e.g., less processing resources are required when compared to transmitting the parameters representing a Gaussian mixture). This is beneficial when a navigation solution needs to be transmitted between objects in high-rate environments (e.g., in vehicle-to-vehicle environments and vehicle-to-everything environments). Transmitting the tight overbound distribution is also more efficient in subsea applications where, for example, communication between objects occurs via acoustic (e.g., sonar) or low frequency radio signals that have limited bit rates.

Moreover, two different tight overbound distributions can be determined for two different solution-separation RAIM algorithms executed by two different filters. Because the different tight overbound distributions are each a single Gaussian, they can be compared to quickly and efficiently determine which filter exhibits better performance.

It should be understood that a wide variety of adaptations and modifications may be made to the techniques. For example, the steps of the flow diagram as described herein may be performed sequentially, in parallel, or in one or more varied orders. Further, it should be understood that the examples as described herein are utilized for illustrative purposes only. In general, functionality may be implemented in software, hardware, or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A navigation system, comprising:
a module executed by a processor; and
for each of a plurality of different regions that define a base distribution that is a mixture of a plurality of components, the module when executed by the processor configured to:
identify a selected evaluation point of the base distribution;
lower-bound the base distribution at the selected evaluation point utilizing a second-order polynomial of the base distribution thereby defining a lower-bound function, wherein the second-order polynomial is determined utilizing a component mean value and a component standard deviation value for each of the plurality of components associated with the base distribution,
upper-bound the base distribution at the evaluation point utilizing a first-order polynomial of an overbound distribution thereby defining an upper-bound function, wherein the first-order polynomial is determined utilizing a selected mean value and a selected standard deviation value;
determine an intersection of the lower-bound function and the upper-bound function;
increment the selected standard deviation value to an incremented overbound standard deviation value when a step size from the selected evaluation point to the intersection is less than or equal to a threshold value; and
determine, for the base distribution, the overbound distribution based on the selected mean value and the incremented overbound standard deviation value.

2. The navigation system of claim 1, wherein the base distribution is a Gaussian mixture and the overbound distribution is a single Gaussian.

3. The navigation system of claim 1, wherein the selected mean value is a median of the base distribution.

4. The navigation system of claim 1, wherein the second-order polynomial includes (1) a first coefficient that is based on a first value of the base distribution at the selected evaluation point, (2) a second coefficient that is based on a second value of a first order derivative, of the base distribution, at the selected evaluation point, and (3) a third coefficient that is based on a minimum value of a second order derivative, of the base distribution, over a selected region of the base distribution from the selected evaluation point to a different evaluation point.

5. The navigation system of claim 1, wherein the first-order polynomial includes (1) a first coefficient that is based on a first value of the overbound distribution at the selected evaluation point, and (2) a second coefficient that is based on a second value of a first order derivative, of the overbound distribution, at the selected evaluation point.

6. The navigation system of claim 1, wherein the module when executed by the processor further configured to:
   determine that the incremented overbound standard deviation value is valid when the step size from the evaluation point to the intersection is greater than the threshold value; and
   determine that the overbound distribution overbounds the base distribution for a selected region of the base distribution defined by the step size.

7. The navigation system of claim 1, wherein the module when executed by the processor further configured to:
   define a next evaluation point of the base distribution by adding the selected evaluation point to a minimum of (1) a predetermined maximum step size and (2) the step size from the selected evaluation point to the intersection.

8. The navigation system of claim 1, further comprising a filter configured to:
   execute a solution algorithm; and
   use the overbound distribution as an estimate of a filter state during execution of the solution algorithm.

9. A method for determining an overbound distribution for a base distribution representing a mixture of a plurality of components, the method comprising:
   for each of a plurality of different regions that define the base distribution:
      identifying a selected evaluation point of the base distribution;
      determining a second-order polynomial of the base distribution utilizing a component mean value and a component standard deviation value for each of the plurality of components associated with the base distribution;
      lower-bounding the base distribution at the selected evaluation point utilizing the second-order polynomial thereby defining a lower-bound function;
      determining a first-order polynomial of the overbound distribution utilizing a selected mean value and a selected standard deviation value;
      upper-bounding the base distribution at the evaluation point utilizing the first-order polynomial thereby defining an upper-bound function;
      determining an intersection of the lower-bound function and the upper-bound function;
      incrementing the selected standard deviation value to an incremented overbound standard deviation value when a step size from the selected evaluation point to the intersection is less than or equal to a threshold value; and
      determining, for the base distribution, the overbound distribution based on the selected mean value and the incremented overbound standard deviation value.

10. The method of claim 9, wherein the base distribution is a Gaussian mixture and the overbound distribution is a single Gaussian.

11. The method of claim 9, wherein the selected mean value is a median of the base distribution.

12. The method of claim 9, wherein the second-order polynomial includes (1) a first coefficient that is based on a first value of the base distribution at the selected evaluation point, (2) a second coefficient that is based on a second value of a first order derivative, of the base distribution, at the selected evaluation point, and (3) a third coefficient that is based on a minimum value of a second order derivative, of the base distribution, over a selected region of the base distribution from the selected evaluation point to a different evaluation point.

13. The method of claim 9, wherein the first-order polynomial includes (1) a first coefficient that is based on a first value of the overbound distribution at the selected evaluation point, and (2) a second coefficient that is based on a second value of a first order derivative, of the overbound distribution, at the selected evaluation point.

14. The method of claim 9, further comprising:
   determining that the incremented overbound standard deviation value is valid when the step size from the evaluation point to the intersection is greater than the threshold value; and
   determining that the overbound distribution overbounds the base distribution for a selected region of the base distribution defined by the step size.

15. The method of claim 9, further comprising:
   defining a next evaluation point of the base distribution by adding the selected evaluation point to a minimum of (1) a predetermined maximum step size and (2) the step size from the selected evaluation point to the intersection.

16. The method of claim 9, further comprising:
   executing a solution algorithm; and
   using the overbound distribution as an estimate of a filter state during execution of the solution algorithm.

17. A non-transitory computer readable medium having software encoded thereon, the software when executed by one or more computing devices operable to:
   for each of a plurality of different regions that define a base distribution:
      identify a selected evaluation point of the base distribution;
      determine a second-order polynomial of the base distribution utilizing a component mean value and a component standard deviation value for each of a plurality of components associated with the base distribution;
      lower-bound the base distribution at the selected evaluation point utilizing the second-order polynomial thereby defining a lower-bound function;
      determine a first-order polynomial of an overbound distribution utilizing a selected mean value and a selected standard deviation value;
      upper-bound the base distribution at the evaluation point utilizing the first-order polynomial thereby defining an upper-bound function;
      determine an intersection of the lower-bound function and the upper-bound functon;
      increment the selected standard deviation value to an incremented overbound standard deviation value when a step size from the selected evaluation point to the intersection is less than or equal to a threshold value; and determine, for the base distribution, the overbound distribution based on the selected mean value and the incremented overbound standard deviation value; and execute a solution algorithm that uses the overbound distribution in determining a solution.

18. The non-transitory computer readable medium of claim 17, wherein the base distribution is a Gaussian mixture and the overbound distribution is a single Gaussian.

19. The non-transitory computer readable medium of claim 17, wherein the selected mean value is a median of the base distribution.

20. The non-transitory computer readable medium of claim 17, wherein the second-order polynomial includes (1) a first coefficient that is based on a first value of the base distribution at the selected evaluation point, (2) a second coefficient that is based on a second value of a first order derivative, of the base distribution, at the selected evaluation point, and (3) a third coefficient that is based on a minimum value of a second order derivative, of the base distribution, over a selected region of the base distribution from the selected evaluation point to a different evaluation point, and the first-order polynomial includes (1) a fourth coefficient that is based on a first value of the overbound distribution at the selected evaluation point, and (2) a fifth coefficient that is based on a second value of a first order derivative, of the overbound distribution, at the selected evaluation point.

* * * * *